United States Patent Office 3,383,514
Patented May 14, 1968

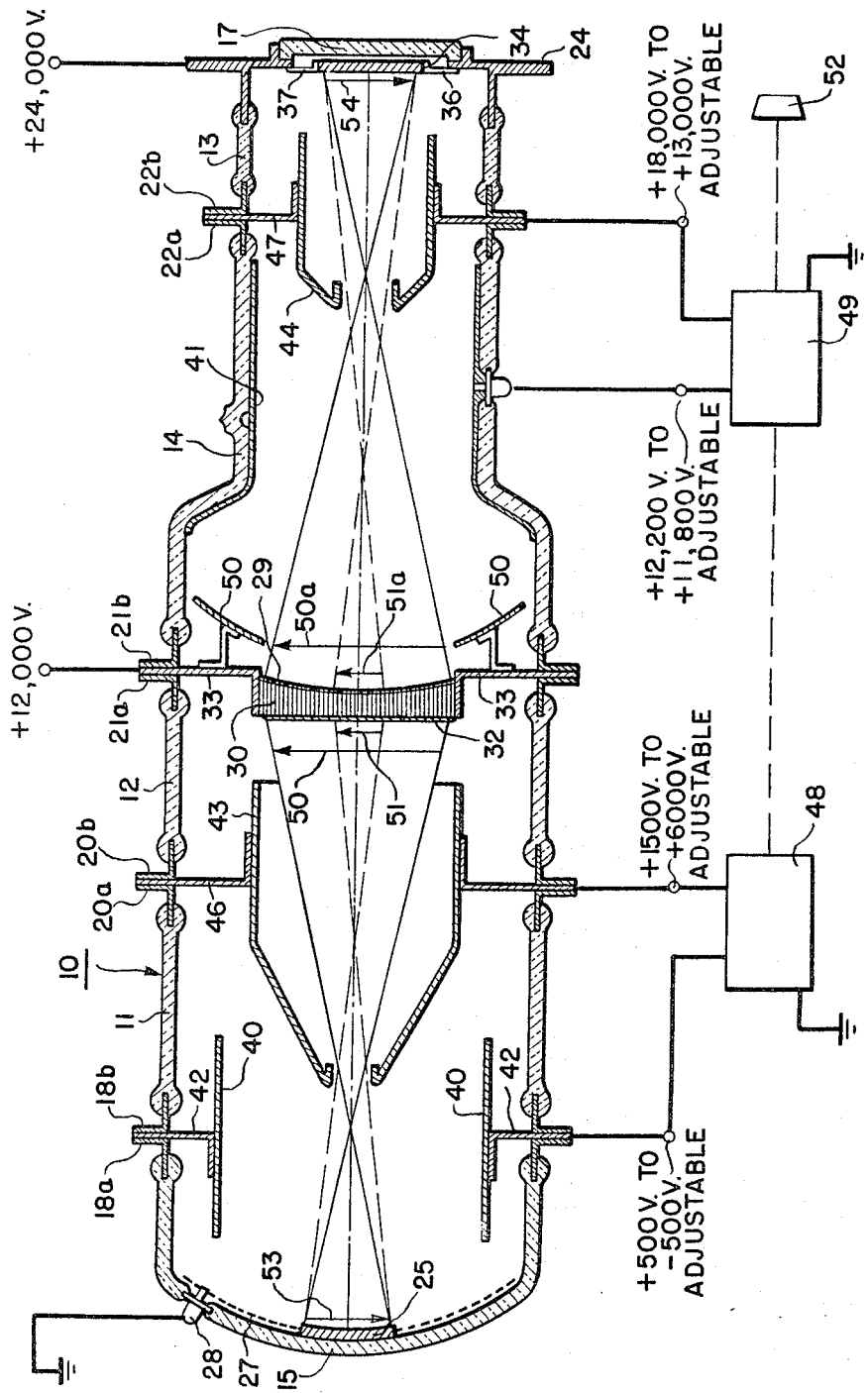

3,383,514
MULTI-STAGE IMAGE CONVERTER WITH BOTH MAGNIFYING AND MINIFYING STAGES
Paul J. Dolon, Skokie, and Wilfrid F. Niklas, Park Ridge, Ill., assignors to The Rauland Corporation, Chicago, Ill., a corporation of Illinois
Filed Jan. 26, 1965, Ser. No. 428,143
13 Claims. (Cl. 250—213)

ABSTRACT OF THE DISCLOSURE

A multi-stage electron tube image converter including a plurality of cascaded image conversion stages at least one of which includes electron optical magnifying means and at least another of which includes electron optical minifying means. A fiber optic element is provided for interstage coupling, and the electron optical systems of the magnifying and minifying stages are ganged to permit variation in the magnification factors in the individual stages which maintain an overall magnification factor of unity. The invention provides improved image resolution and/or improved signal-to-noise ratio as compared with a tube having the same number of stages with unity magnification factor in each stage.

---

The present invention relates generally to electro-optical systems and, more particularly, to multi-stage image conversion devices and the like.

It is well understood that an electron image may be projected from a photoemissive cathode in response to the excitation of incident radiation, whether visible or invisible, representing a source or object image. The photoemissive cathode, responding to the incident radiation, generates an electron image which may be directed or propagated by use of a suitable electric field to a fluorescent viewing screen where the electron image is converted to a visible reproduction constituting a replica of the original image projected on the photoemissive cathode. Often it is necessary or desirable to cascade a plurality of such image converters to effect even further image amplification or intensification prior to viewing. Customarily such multi-stage tubes are enclosed within a single evacuated envelope and the output element of one stage located in close proximity to the input element or photo-cathode of the succeeding stage, the stages being interconnected by some form of optical coupling medium.

Many modern image converters also employ electron optical elements intermediate the photoemissive cathode and the fluorescent viewing screen for the purpose of focusing and accelerating the electrons to the screen while minimizing distortion in the reproduced image. A typical electron optical system comprises an anode containing an aperture through which electrons emitted by the photocathode may be directed to impinge upon a fluorescent screen. An accelerating voltage is imposed upon the anode to establish the necessary electric field, and a suitably shaped focusing electrode is interposed between the anode and the photo-cathode to accomplish, in conjunction with the anode, the necessary accelerating and focusing effects. This electron optical system maintains the pictorial integrity of the image during its propagation through the tube, and it may also be designed for magnifying the size of rather small objects or minifying larger objects to obtain, in the latter case, a more intense or brilliant viewing image than otherwise possible. Thus, multi-stage electro-optical devices for either magnifying or minifying an object image are well known to the art.

It is an object of the present invention to provide a new and improved electro-optical system.

It is another object of the present invention to provide a multi-stage image intensifier capable of achieving improved image resolution capabilities in comparison to prior art systems.

It is a further object of the present invention to provide a multi-stage image intensifier yielding improved quantum noise characteristics over prior art systems.

It is still another object of the invention to provide an image converter allowing practical optimization of pictorial quality over a wide range of object types and operating conditions.

In accordance with the invention, a multi-stage image converter enclosed within a single evacuated envelope for developing a high resolution viewing image includes a plurality of cascaded image conversion stages, each comprising an input element responsive to incident radiation for developing an electron image and an output element for developing a photon image corresponding to the electron image, with at least one of the stages including electron optical magnifying means and at least another of the stages including electron optical minifying means.

The features of the present invention which are believed to be novel are set forth with particularity in the appended claims. The invention, together with further objects and advantages thereof, may best be understood by reference to the following description taken in connection with the accompanying drawing, in which the single figure is a cross-sectional view of a dual-stage image converter embodying the invention.

A multi-stage electro-optical system, shown for convenience in the single figure of the drawing as a dual-stage system, comprises an evacuated envelope formed of a series of essentially cylindrical sections joined by a plurality of circumferential shoulder pieces and terminating at opposite ends in transverse closure portions. More specifically, an evacuated envelope 10 comprises a series of cylindrical glass sections 11, 12 and 13, the latter two being joined by a tapered matching section 14. The remainder of the glass envelope comprises a substantially spherical end closure segment 15 having a diameter approximately equal to that of the cylindrical portion of envelope section 10, and a substantially flat transverse viewing portal 17. The various sections are presealed around their perimeters to respective metal flanges 18a and 18b, 20a and 20b, 21a and 21b, and 22a and 22b which, in turn, are joined, as by heliarc welding or the like, to interposed respective electrode support structures of the intensifier system to be described. Similarly, window 17 is rigidly affixed to glass section 13 by a peripheral T-shaped metal support member 24. The aforesaid support structures also serve as output terminals for the respective tube elements and are connected to suitable electrical potential sources to be considered. Of course, it will be understood that the glass envelope except for the area encompassed by the input and output screen portions is covered with a black or otherwise opaque coating to avoid the deleterious effects of ambient light.

Suitably mounted on the inner surface of transparent segment 15 is an input element in the form of a pick-up screen 25 which follows generally the contour of a sector of front wall 15. The pick-up screen as will be understood may include a phosphor responsive to X-rays, infrared or other invisible radiation, but for the specific embodiment under consideration is sensitive to impinging visible light rays and to that end is composed of a photoemissive layer such as an intermetallic compound of antimony and cesium. An optically clear electrical contact layer 27 for pick-up screen 25 spans segment 15 and is provided with a conductive contact to a thimble-like output electrode 28 inserted through the envelope which, in operation, is coupled to ground, as shown, or to an appropriate potential source. A similar pick-up screen 29 comprising a photoemissive layer and an associated conductive contact coating forms the input element of a second image conversion stage and is deposited on one face of an element 30 having a spherical contour similar to that of segment 15. As will presently be explained, means 30 also serves as an interstage coupling medium, and preferably is composed of a fiber optical component. On the opposite, flat, surface of element 30 is an output element 32 for the first stage comprising a phosphor screen composed of a layer of zinc sulfide or the like coated with an aluminum contact layer, as is the second stage output element, or ultimate viewing screen 34. Interstage coupler 30 and associated elements 29, 32 are supported by an L-shaped bracket 33 welded between flanges 21a and 21b. Likewise screen 34 is supported by brackets 36, 37 which are themselves fixed to member 24. The mounting structures are also conductive and are coupled to appropriate energy sources of, for example, 12,000 volts and 24,000 volts, respectively, for delivering the desired operating potentials to screens 29, 32 and 34.

A focusing and accelerating arrangement is interposed intermediate photoemissive cathode 25 and phosphor screen 30 and likewise between second photo-cathode 29 and the ultimate viewing screen 34. These systems respectively comprise circumferential focus electrodes 40 and 41 each adjacent the inner surface of the envelope, and respective anode structures 43 and 44. The focus electrodes span the entire cylindrical portion of the envelope and may take the form of a conductive wall coating, as electrode 41, or be set away from the wall closer to the electron beam path as in the case of electrode 40 which is supported by a combination mounting bracket-output terminal 42. It is understood that the particular structure adapted is solely a matter of convenience to the extent that it is consistent with necessary electron-optical considerations. At any rate, these electrodes are respectively connected to appropriate potential means or sources 48 and 49, which for reasons to be discussed, are preferably adjustable over wide ranges, such as between +500 volts and −500 volts for electrode 40 and 12,200 volts and 11,800 volts for electrode 41.

Anodes 43 and 44 are generally similar metallic structures, partially cylindrical and partially conical in contour. As shown, anodes 43, 44 are electrically insulated from their respective output elements 32, 34 which for reasons to be discussed affords the inventive structure further versatility. The anodes are supported respectively by flanged mounting brackets 46 and 47 and also receive appropriate positive operating potentials via these brackets from potential sources 48 and 49, respectively. As with focusing electrodes 40 and 41, the operating potentials from sources 48 and 49 for the anode structures 43 and 44, are capable of wide variation, as from 1500 volts to 6000 volts and 18,000 volts to 13,000 volts, respectively. The second intensifier stage is also provided with a beam forming electrode 50 both physically and electrically coupled to bracket 33 and, hence, to the illustrated 12,000 volt potential source.

Considering now the operation of the image conversion device of the invention, it will be understood that a desired object image is placed before front face plate 15 in juxtaposition with photoemissive surface 25. Light quanta or photon flux from the object impinges upon surface 25 and the resulting electron current emitted therefrom is propagated along a predetermined path to intermediate screen 32. For the present it is assumed that the first image convereter stage magnifies the object image and the latter stage effects a corresponding minification; however, as will presently be shown it is also useful in some circumstances and in accordance with a further aspect of the invention to minify an image prior to magnifying it in a plural stage conversion system. Particularly, by way of example and in no sense by way of limitation, electrodes 40 and 43 are operated at +500 volts and 1500 volts, respectively to provide a 2:1 magnification of the viewed image in the first stage and electrodes 41 and 44 at 12,200 and 18,000 volts, respectively to accomplish a corresponding or 2:1 minification in the second stage, as represented schematically by image arrows 53, 50, 50a and 54 and the associated solid beam outlines. Similarly, and as will subsequently be considered, electrodes 40, 43, 41 and 44 are operated at −500 volts, 6000 volts, 11,800 volts and 13,000 volts, respectively, to obtain a 2:1 minification in the first stage and a 2:1 magnification in the output stage, as represented by arrows 53, 51, 51a and 54 and the accompanying dashed beam outlines. Also, as will be discussed in greater detail, each of the image converter stages is capable of operation at any point intermediate the aforesaid respective limits.

As can be appreciated, the discernible detail of an image projected on phosphor screen 32 is dependent upon such factors as phosphor particle size, errors in propagation of the electron image and in reimpressioning of the image on the surface 32, and the detail originally perceived by the photo screen 25. Such is also the case with the image impressed upon photoemissive screen 29 and reproduced in viewing screen 34, the loss in resolution in each stage being compounded by succeeding stages. Generally, the point of greatest resolution loss occurs in coupling between the respective stages. Specifically, light rays emanating from the phosphor output screen of one stage tend to spread quite naturally in a conical pattern until intercepted by the input screen of the following stage, the final diameter of the conical rays being proportional to the spacing between the respective screens. To reduce this spreading effect and consequent loss of resolution, it has become conventional to insert a fiber optical component between the respective screens. As is well-known, such components are composed of a multitude of thin glass fibers each of which is constructed so as to restrict the spreading of an axially propagated light beam to the diameter of its core. This, of course, has somewhat alleviated the problem due to light spreading. However, the individual information transducing channels of the fiber-optic component remain, in the present state of the art, of a relatively large diameter; hence the resolution transfer capability of the interstage coupling medium continues to be a principal resolution-limiting factor of the system.

In the illustrated embodiment of the invention, the resolution transfer capability required of the interstage coupling device is effectively and substantially reduced. Specifically, the image detected by photoemissive surface 25 is magnified during propagation to screen 32; thus a detail of area $\Delta A$ on pick-up screen 25 occupies a much greater area, i.e., $M\Delta A$, on phosphor screen 32, where M is the magnification factor of the stage. Thus, where the interstage coupling element would have a resolution transfer capability, $R_1$, for a unity magnification stage, it will now possess an effective resolution capability higher by a factor of M, as a given detail is now larger in area by a factor of M. If the overall or total resolution, $R_t$, of a two stage image tube is limited by the interstage coupler alone, then overall resolution will also be improved by a factor of M. By employing a subsequent minifying stage for reducing the magnified image by a factor $1/M$, the viewed image appears with the same size and brightness as that provided by a two stage unity magnification system, the brightness loss in the first stage being compensated by the brightness gain in the second, but the resolution is substantially improved. Specifically, in terms of the accompanying figure where the magnification offered by the first stage is 2 and the minification of the second stage is likewise 2, the effective total resolution $R_t$ is twice that provided by a pair of cascaded unity magnification stages employing an interstage coupling medium of a resolution transfer capability equal to that of medium 30.

From the aforegoing, it would appear that the intermediate image size could be increased until the effective transfer capability of the interstage coupling media no longer imposed a restriction on resolution, but an assumption to the above, namely, that the effects of signal and device generated quantum noise are always negligible, is usually not the case. In fact, under certain conditions and also in accordance with the invention, it may prove even more advantageous to minify a viewed image and then subsequently magnify it. For example, it is known that the probability of converting electrons to photons in a cathodo-luminescent screen is a fraction appreciably less than equity for very low input current densities, but which increases relatively rapidly with increasing current densities. Also, the phosphor conversion efficiency, or the number of photons generated per electron for the aforegoing fraction of total impinging electrons, increases with increasing current densities. Hence, it is doubly advantageous to operate at high signal levels. This is especially true as the signal-generated quantum noise is not usually of sufficient intensity to enjoy the higher probability factor or conversion efficiency, and thus the signal-to-noise ratio of the stage is considerably improved. Therefore, under certain viewing conditions, as where the object image presents a low level signal, it is preferable to minify the image in the first stage to increase the electron current density, obtain the benefits of a higher electron to photon conversion efficiency and probability factor, and then magnify back to the original size in a second or subsequent stage. A significant signal to noise advantage is obtained over an equivalent number of cascaded unity magnification stages by using this structure.

However, since the image in the above case is first minified, the resolution transfer capability required of the interstage coupling medium is made more stringent, rather than relaxed. It therefore becomes apparent that quantum noise performance and pictorial resolution are related, but in an inverse or opposing manner. Consequently, an image may be magnified to increase the effective resolution transfer capabilities of the interstage coupling element to the extent that the signal to noise ratio of the reproduced image is not so degraded as to represent a greater impediment to pictorial quality than the resolution difficulty, and under certain viewing conditions, the picture quality is best when a minification stage precedes the magnification stage.

Since the relative importance of these two limitations with respect to pictorial quality shifts with changing input flux densities and other operating conditions, the intermediate magnification and minification factors of the multi-stage tube may be made capable of variations for optimum viewing. To this end, and in accordance with another feature of the invention, anodes 43, and 44 may be made electrically independent of their respective viewing screens 32, and 34 to permit relative differences in potential to exist therebetween, varying magnitudes of which allow corresponding variations in the size of the prejected image between the limits represented by the dotted and solid beam outlines in the figure, and as schematically depicted by the arrows.

For example, for a given potential difference existing between anode 43 and screen 32 and potential of focus electrode 40, the picture reproduced on screen 32 is of the size of arrow 50. For a substantially increased potential difference between these points in conjunction with an appropriately different potential on electrode 40 the size of the reproduced image is substantially smaller, as understood in the art and illustrated by shorter arrow 51. Similar adjustments in potential between the second stage anode 44 and its associated output screen 34 to provide an output image at screen 34 which is of constant size for different size input images 50a to 51a at photosurface 29.

Thus, it can be seen that a double stage tube, or a multi-stage tube, having at least one magnification stage and at least one minification stage each allowing of variable image magnification or minification permits the operator to optimize the quality of the viewed picture over wide dynamic ranges of input flux densities and other operating conditions. The optimum condition is determined visually by the operator as he adjusts the operating voltages through their ranges. In accordance with yet a further feature of the invention, the controls for varying the potentials between the anode and viewing screen of each stage and perhaps also making minor adjustments in the focusing electrodes of each stage, may be ganged in a predetermined manner to preserve the condition that $M_1 \times M_2 \times \ldots M_n$, i.e. the overall magnification factor, is a constant, including unity. The operator thus need only adjust a single control knob 52 varying the relative magnification or minification factors of the cascaded image conversion stages, yet by virtue of the ganging the size of the picture projected upon his viewing screen remains constant.

To effect the above, voltage supply 48 preferably is equipped to effect a predetermined tracking of electrical potential between focusing electrode 40 and anode 43 over the entire breadth of their respective operating ranges to permit continuous variation in the size of the image projected on screen 32, without distortion, between the limits defined by the solid and dashed beam outlines corresponding to arrows 50 and 51, respectively. Likewise potential source 49 accommodates a predetermined tracking of potential between electrodes 41, 44 such that the size of the image projected upon viewing screen 34 remains constant in size and substantially undistorted independent of variations in the intermediate image size, as defined by arrows 50a and 51a. According to a further feature of the invention and to effect further simplicity for the operator, sources 48 and 49 are ganged in a predetermined fashion, as shown schematically by the dashed line extending between them, to provide the illustrated latitude of intermediate image size from a single manual control means 52.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A multi-stage image converter enclosed within a single evacuated envelope for developing a high resolution viewing image, comprising:
   a plurality of cascaded image conversion stages each comprisng an input element responsive to incident radiation for developing an electron image and an output element for developing a photon image corresponding to said electron image, at least one of said stages including electron optical magnifying means, and at least another of said stages including electron optical minifying means.

2. The invention according to claim 1 wherein the input element of each stage comprises a photoemissive layer and the output element of each stage is a phosphor screen, the output element of one of said stages being optically coupled to the input element of another of said stages.

3. A multi-stage image converter enclosed with a single evacuated envelope for developing a high resolution viewing image, comprising:
   a plurality of image conversion stages at least the first of which comprises an input element responsive to incident radiation for developing an electron image and at least the last of which comprises an output element for developing a photon image corresponding to said electron image, at least one of said stages including electron optical magnifying means, and at least another of said stages including electron optical minifying means;
   and interstage coupling means for effectively cascading said image conversion stages.

4. The invention according to claim 3 wherein the input element of each of said stages comprises a photoemissive layer, the output element of each of said stages comprises a phosphor screen, and said interstage coupling means comprises a fiber optic element interposed between the phosphor screen of one stage and the input element of another.

5. A multi-stage image converter enclosed within a single evacuated envelope for developing a high resolution viewing image, comprising:
   a first and second image conversion stage each comprising an input element responsive to incident radiation for developing an electron image and an output element for developing a photon image corresponding to said electron image;
   interstage optical coupling means interposed between the output element of said first stage and the input element of said second stage for effectively cascading said image conversion stages, said coupling means having a predetermined resolution transfer capability limiting the resolution capability of said multi-stage converter;
   and electron optical magnifying means included in said first stage and electron optical minifying means included in said second stage for effectively increasing the overall resolution capability of said image converter above said resolution transfer capability of said interstage coupling means.

6. A multi-stage image converter enclosed within a single evacuated envelope for developing a high resolution viewing image, comprising:
   a pair of image conversion stages each comprising an input element including a photoemissive layer responsive to incident radiation for developing an electron image for propagation along a predetermined path and an output element including a phosphor screen oriented substantially transverse to said path for intercepting said propagated electron image to develop a corresponding photon image;
   a fiber optic interstage coupler for optically coupling said output element of one of said stages to said input element of the other of said stages, said interstage coupler being inherently incapable of transferring the minimum resolvable detail on said output element of said first stage to said input element of said second stage;
   and electron optical magnifying means included in said first stage and electron optical minifying means included in said second stage for effectively increasing the overall resolution transfer capability of said image converter above said resolution transfer capability of said interstage coupler.

7. A multi-stage image converter enclosed within a single evacuated envelope for developing a high resolution viewing image, comprising:
   a plurality of cascaded image conversion stages each comprising an input element responsive to incident radiation of a predetermined intensity for developing an electron image and an output element for developing a photon image corresponding to said electron image, said output element having a first predetermined electron to photon conversion efficiency at single levels equal to said predetermined intensity and a second, higher conversion efficiency at signal levels greater than said predetermined intensity;
   and means including electron optical minifying means in at least the first of said stages and electron optical magnifying means in another of said stages for substantially improving the signal to noise characteristics of said viewed image.

8. A multi-stage image converter enclosed within a single evacuated envelope for developing a high resolution viewing image, comprising:
   a plurality of image conversion stages each comprising an input element responsive to incident radiation of a predetermined intensity for developing an electron image and an output element for developing a photon image corresponding to said electron image, said output element having a first predetermined electron to photon conversion efficiency at signal levels equal to said predetermined intensity and a second, higher conversion efficiency at signal levels greater than said predetermined intensity;
   interstage coupling means for effectively cascading said image conversion stages;
   and means including electron optical minifying apparatus in at least the first of said stages and electron optical magnifying apparatus in at least the last of said stages for substantially improving the signal to noise characteristics of said viewed image.

9. The invention according to claim 8 wherein the input element of each of said stages comprises a photoemissive layer, the output element of each of said stages comprises a phosphor screen, and said interstage coupling means comprises a fiber optical element interposed between the phosphor screen of one stage and the input element of another.

10. The invention according to claim 9 wherein the product of the individual magnification and minification factors of all of said stages is substantially equal to unity.

11. A multi-stage image converter enclosed within a single evacuated envelope for developing a high resolution viewing image, comprising:
    a plurality of image conversion stages each comprising an input element responsive to incident radiation for developing an electron image and an output element for developing a photon image corresponding to said electron image, at least one of said stages including electron optical magnifying means, and at least another of said stages including a electron optical minifying means;
    interstage coupling means for effectively cascading said image conversion stages;
    and means for varying the relative magnification and minification provided by the respective electron optical means in said stages.

12. A multi-stage image converter enclosed in a single evacuated envelope for developing a high resolution viewing image, comprising:
    a plurality of image conversion stages each comprising an input element responsive to incident radiation of a predetermined intensity for developing an electron image and an output element for developing a photon image corresponding to said electron image, said output element having a first predetermined electron to photon conversion efficiency at signal levels equal to said predetermined intensity and a second, higher conversion efficiency at signal levels greater than said predetermined intensity;
    interstage coupling means interposed between the output element of one of said stages and the input element of the succeeding stage for effectively cascading said image conversion stages, said coupling means having a predetermined resolution transfer capability limiting the resolution capability of said multi-stage converter;
    and means for varying the respective relative magnification and minification of said electron optical means for effecting an optimum compromise between the signal to noise performance and resolution capability of said image converter over a wide range of input flux densities.

13. A multi-stage image converter enclosed in a single evacuated envelope for developing a high resolution viewing image, comprising:
    a plurality of image conversion stages each comprising an input element responsive to incident radiation of a predetermined intensity for developing an electron image and an output element for developing a photon image corresponding to said electron image, said output element having a first predetermined electron photon conversion efficiency at signal levels equal to said predetermined intensity and a second, higher conversion efficiency at signal levels greater than said predetermined intensity;

interstage coupling means interposed between the output element of one stage and the input element of the succeeding stage for effectively cascading said image conversion stages, said coupling means having a predetermined small resolution transfer capability limiting the resolution capability of said multi-stage converter;

electron optical magnifying means in at least one of said stages, said magnifying means being electrically insulated from its associated output element;

electron optical minifying means in at least one of the other of said stages, said minifying means being electrically insulated from its associated output element;

means for varying the relative magnification and minification of said electron optical means for effecting an optimum compromise between the signal to noise performance and resolution capability of said image converter over a wide range of input flux densities;

and means including said varying means for maintaining the product of the magnification and minification factors of each of said image conversion stages substantially constant.

References Cited

UNITED STATES PATENTS

| | | | |
|---|---|---|---|
| 2,727,182 | 12/1955 | Francken | 250—213 X |
| 2,851,625 | 9/1958 | Ruedy et al. | 250—213 X |
| 2,928,969 | 3/1960 | Schneeberger | 250—213 X |
| 3,014,147 | 12/1961 | Morton | 313—65 |
| 3,141,105 | 7/1964 | Courtney-Pratt | 350—96 X |
| 3,166,395 | 1/1965 | Hicks | 350—96 X |
| 3,188,188 | 6/1965 | Norton | 350—96 X |
| 3,286,114 | 11/1966 | Schlesinger | 250—213 X |

RALPH G. NILSON, *Primary Examiner.*

M. A. LEAVITT, *Assistant Examiner.*